(12) United States Patent
Nurmi (10) Patent No.: US 8,826,159 B2
(45) Date of Patent: Sep. 2, 2014

(54) METHOD, DEVICE AND COMPUTER SOFTWARE PRODUCT FOR CONTROLLING USER INTERFACE OF ELECTRONIC DEVICE

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 1123 days.

(21) Appl. No.: 11/922,372

(22) PCT Filed: Jun. 15, 2006

(86) PCT No.: PCT/FI2006/050263
§ 371 (c)(1),
(2), (4) Date: Dec. 17, 2007

(87) PCT Pub. No.: WO2006/136655
PCT Pub. Date: Dec. 28, 2006

(65) Prior Publication Data
US 2009/0113321 A1     Apr. 30, 2009

(30) Foreign Application Priority Data
Jun. 20, 2005   (FI) ..................................... 20055330

(51) Int. Cl.
*G06F 3/048* (2013.01)
*H04M 1/02* (2006.01)
*G06F 1/16* (2006.01)
*G06F 3/0482* (2013.01)
*H04M 1/725* (2006.01)

(52) U.S. Cl.
CPC ........... *G06F 1/1616* (2013.01); *H04M 1/0245* (2013.01); *H04M 1/72547* (2013.01); *H04M 1/72544* (2013.01); *H04M 1/72522* (2013.01); *G06F 1/1677* (2013.01); *H04M 2250/16* (2013.01); *H04M 1/72583* (2013.01); *G06F 3/0482* (2013.01); *G06F 1/1647* (2013.01)

USPC ............................................ 715/764; 715/810

(58) Field of Classification Search
USPC ........ 715/764, 778, 810, 823; 455/456, 556.1
See application file for complete search history.

(56) References Cited

U.S. PATENT DOCUMENTS

| 5,900,848 | A  | 5/1999 | Haneda et al. |
| 6,747,609 | B2 | 6/2004 | Antila et al. |

(Continued)

FOREIGN PATENT DOCUMENTS

| EP | 1 248 184 | 10/2002 |
| EP | 1 387 246 | 2/2004 |

(Continued)

OTHER PUBLICATIONS

Office Action dated May 31, 2010 from Canadian Application No. 2,610,199, 3 pages.

(Continued)

*Primary Examiner* — Linh K Pham
(74) *Attorney, Agent, or Firm* — Harrington & Smith (57) ABSTRACT

The invention relates to controlling of a user interface of an electronic device (100). On a secondary display (104) of the electronic device (100), a list of executable applications is displayed. A selection for selecting a specific application is received from the user. When the user mechanically sets the electronic device (100) from transport state to principal operational state, a primary display of the electronic device (100) is taken into use. In principal operational state, a predetermined function relating to the user's selection is performed in the electronic device (100), whereby information relating to the procedure is displayed on the primary display of the electronic device (100).

33 Claims, 3 Drawing Sheets

(56) References Cited

U.S. PATENT DOCUMENTS

| | | | |
|---|---|---|---|
| 7,321,789 B2* | 1/2008 | Ishihara et al. | 455/575.3 |
| 7,515,193 B2* | 4/2009 | Honda | 348/333.05 |
| 7,848,783 B2* | 12/2010 | Taneya et al. | 455/566 |
| 2002/0022503 A1* | 2/2002 | Lee | 455/566 |
| 2002/0142810 A1* | 10/2002 | Kawasaki et al. | 455/566 |
| 2002/0173965 A1 | 11/2002 | Curry et al. | |
| 2003/0013493 A1* | 1/2003 | Irimajiri et al. | 455/566 |
| 2003/0181228 A1* | 9/2003 | Kim | 455/575.3 |
| 2004/0014488 A1* | 1/2004 | Sawayama et al. | 455/550.1 |
| 2004/0116167 A1* | 6/2004 | Okuzako et al. | 455/575.3 |
| 2004/0141011 A1* | 7/2004 | Smethers et al. | 345/810 |
| 2004/0268004 A1 | 12/2004 | Oakley | |
| 2005/0064911 A1 | 3/2005 | Chen et al. | |
| 2005/0083642 A1 | 4/2005 | Senpuku et al. | |
| 2005/0216834 A1* | 9/2005 | Gu | 715/522 |
| 2006/0205432 A1* | 9/2006 | Hawkins et al. | 455/552.1 |
| 2007/0081638 A1* | 4/2007 | Taneya et al. | 379/88.11 |
| 2007/0161415 A1* | 7/2007 | Sawayama et al. | 455/575.3 |
| 2008/0220821 A1* | 9/2008 | Okuzako et al. | 455/566 |
| 2012/0289287 A1* | 11/2012 | Kokubo | 455/556.1 |

FOREIGN PATENT DOCUMENTS

| | | |
|---|---|---|
| EP | 1 387 554 | 2/2004 |
| EP | 1 631 045 | 3/2006 |
| KR | 2002038136 A * | 5/2002 |
| WO | WO 03/103177 | 12/2003 |
| WO | WO 2005/009010 | 1/2005 |

OTHER PUBLICATIONS

Office Action dated Sep. 21, 2011 from Canadian Application No. 2,610,199, 4 pages.

* cited by examiner

METHOD, DEVICE AND COMPUTER SOFTWARE PRODUCT FOR CONTROLLING USER INTERFACE OF ELECTRONIC DEVICE

FIELD

The invention relates to controlling a user interface of an electronic device comprising two displays.

BACKGROUND

It has become more and more common that portable electronic devices—particularly mobile phones—include flip-type solutions, in which the electronic device may be set to transport state when the device is not used temporarily. This type of solution enables the device to have a small size and a large display compared to the size of the device.

Such an electronic device may comprise two displays, of which the primary display is intended for the principal use of the device when the device is in its operational state. Being set to transport state, the display of the device is usually covered to protect the display unit from scratching. A secondary display may be a display which is considerably smaller and mainly serves only as an informative display informing the user of time, for instance. If the electronic device is a mobile phone, the secondary display may inform the user of the caller's name and/or telephone number or of the received calls or messages. Thus, the user cannot apply functions or applications of the device when the device is in transport state, because the secondary display only provides unidirectional interaction with the user.

Nokia Communicator® includes a solution, in which the electronic device comprises two displays, of which the larger, i.e. primary display is used when the device is in principal operational state, i.e. when the device is used as a PDA (Personal Digital Assistant). The smaller, i.e. secondary display is used when the device is in transport state, i.e. when the device mainly serves as a mobile phone. In this solution, the secondary display may also be used for bidirectional interaction with the user. The user may use the secondary display unit for carrying out procedures relating to call and message handling.

BRIEF DESCRIPTION

It is an object of the invention to implement an improved method, an improved electronic device and an improved computer software product for controlling a user interface of the electronic device.

One aspect of the invention is to provide a method for controlling a user interface of an electronic device, the method comprising: receiving a selection from the user for selecting a specific application from a list of executable applications on a secondary display of the electronic device and taking a primary display of the electronic device into use when the user mechanically sets the electronic device from transport state to principal operational state. The method is characterized by further comprising: performing a predetermined function relating to the user's selection in the electronic device, whereby information relating to the procedure is displayed on the primary display of the electronic device.

The invention also relates to an electronic device comprising a primary display, which is applicable when the electronic device is in principal operational state, a secondary display, which is applicable at least when the electronic device is in transport state, an input unit for receiving inputs of the user, and a processing unit connected to the primary and the secondary display and to the input unit and configured to receive via the input unit a selection from the user for selecting a specific application from a list of executable applications on the secondary display of the electronic device and to take the primary display of the electronic device into use when the user mechanically sets the electronic device from transport state to principal operational state. The electronic device is characterized in that the processing unit is also configured to perform a predetermined function relating to the user's selection from the list of executable applications on the secondary display in the electronic device, whereby, controlled by the processing unit, information relating to the procedure is displayed on the primary display of the electronic device.

The invention further relates to an electronic device comprising primary display means, which are applicable when the electronic device is in principal operational state, secondary display means, which are applicable at least when the electronic device is in transport state, input means for receiving inputs of the user, means for receiving via the input means a selection from the user for selecting a specific application from a list of executable applications on the secondary display means of the electronic device, means for taking the primary display means of the electronic device into use when the user mechanically sets the electronic device from transport state to principal operational state. The electronic device is characterized in that the electronic device also comprises means for performing a predetermined function relating to the user's selection from the list of executable applications on the secondary display means in the electronic device, whereby information relating to the procedure is displayed on the primary display means of the electronic device.

The invention further relates to a computer software product comprising instructions to execute a process for controlling a user interface of an electronic device, the process comprising: receiving a selection from the user for selecting a specific application from a list of executable applications on a secondary display of the electronic device, and taking a primary display of the electronic device into use when the user mechanically sets the electronic device from transport state to principal operational state. The computer software product is characterized in that the process also comprises: performing a predetermined function relating to the user's selection in the electronic device, whereby information relating to the procedure is displayed on the primary display of the electronic device.

Many advantages are achieved with the invention. The invention provides an intuitive way of combining the operation of the primary and secondary displays of the electronic device. The user may carry out procedures by using the secondary display of the electronic device when the electronic device is in transport state, set the electronic device to principal operational state and start to use the primary display of the electronic device without having to perform the same procedures again. This accelerates the performing of the procedures and makes the device user-friendlier.

LIST OF FIGURES

The invention will now be described in greater detail in association with preferred embodiments and with reference to the attached drawings, in which.

DESCRIPTION OF EMBODIMENTS

Figure 1:
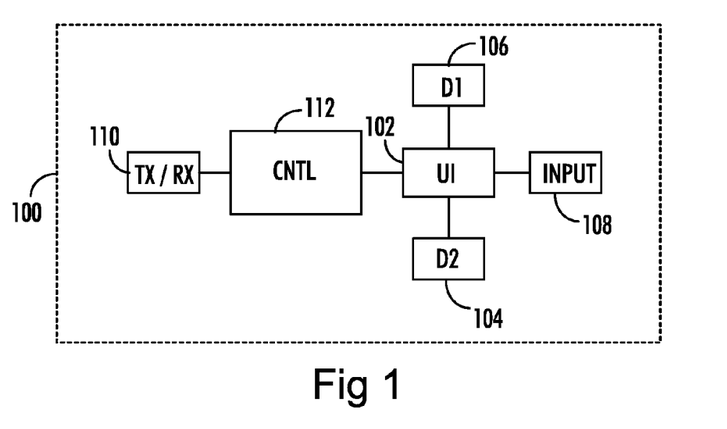
FIG. 1 shows a structure of an electronic device according to an embodiment of the invention.

With reference to FIG. 1, the structure of an electronic device 100 according to an embodiment of the invention is described next. The electronic device 100 may be, for instance, a subscriber terminal of a mobile communication system, computer, palm-sized computer (PDA, Personal Digital Assistant), or a similar data processing apparatus.

The electronic device 100 comprises a processing unit 112 controlling and monitoring functions of the electronic device 100, e.g. processing of data stored in the electronic device 100 and management of user interface 102 parts, such as information display to the user and handling of received inputs. Nowadays the processing unit 112 is mostly implemented as a digital signal processor (DSP) including the necessary software for controlling the electronic device 100. Various hardware implementations—such as ASIC (Application Specific Integrated Circuit)—are also feasible.

The electronic device also comprises the user interface 102 for interaction between the electronic device 100 and its user. The user interface comprises a primary display 106 and a secondary display 104. The primary display 106 is intended for the principal use of the electronic device and may be larger than the secondary display 104. The secondary display 104 may be intended to be used together with the primary display, for instance. The secondary display 104 may also be intended for performing simple procedures, which do not require a large display space. The electronic device 100 further comprises input means (an input unit) 108 for receiving inputs of the user. The input means 108 may be implemented, for instance, as a keyboard or a touch-sensitive surface. The input means 108 may also be integrated into the primary and/or secondary display 106, 104 in the form a touch-sensitive display. The input means 108 may further comprise a specific selection component for moving a cursor on the display and carrying out selections.

The electronic device 100 may also comprise a data transmission unit 110 comprising means for transmitting data between the electronic device 100 and other electronic devices. Data may be transmitted, for instance, via the GSM (Global System for Mobile Communications), GPRS (General Packet Radio Service), UMTS (Universal Mobile Telecommunications System) or other similar mobile communication system. The data transmission system may also be some other wireless data transmission system, such as a Bluetooth®, IrDA (Infrared Data Association) or WLAN (Wireless Local Area Network) system. The data transmission system may also be a fixed wired system, such as a DSL (Digital Subscriber Line) system or an Ethernet local area network. The electronic device may comprise means for either sending or receiving data or means for both sending and receiving.

The electronic device 100 may be a device with two parts and may be mechanically set from principal operational state to transport state, and vice versa. The parts of a two-part electronic device 100 may be arranged in such a manner that, when the electronic device 100 is set from principal operational state to transport state, the first part of the device serves as a cover for the primary display 106 in the second part of the device (e.g. FIGS. 2A and 2B). The electronic device 100 may comprise a connecting mechanism 212, such as a hinge, between the parts. The connecting mechanism 212 may be used for bringing the electronic device 100 mechanically from principal operational state to transport state by moving the two parts of the electronic device 100 against each other so that the electronic device 100 takes less space. Correspondingly, when the electronic device 100 is brought mechanically from transport state to principal operational state, the two parts of the electronic device 100 may be taken further away from each other by means of the connecting mechanism 212.

Figure 2A:
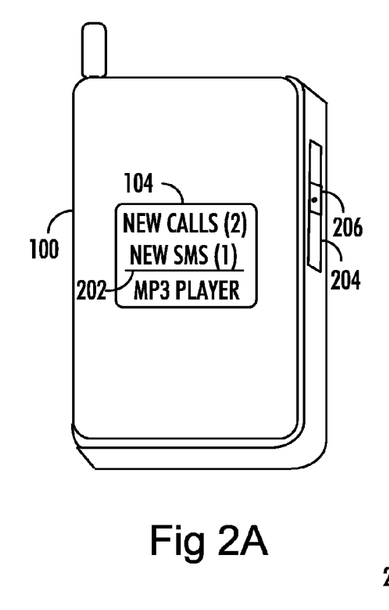
FIG. 2A shows an electronic device according to an embodiment of the invention in transport state, the secondary display of the electronic device displaying a list of executable applications.

In the following, the operation of an electronic device 100 according to an embodiment of the invention is described with reference to FIGS. 2A and 2B. FIG. 2A shows the electronic device 100 in transport state. In this example, the electronic device is a flip type of mobile phone. The electronic device 100 comprises a secondary display 104, by which information can be displayed to the user of the electronic device 100. When the electronic device 100 is temporarily not used, i.e. the electronic device 100 is e.g. in stand-by state, the secondary display 104 may, e.g. for power saving reasons, display time, for instance, and inform the user of received messages and/or calls, to which the user has not reacted yet. The secondary display 104 may also display other information when the electronic device 100 is temporarily not used.

The electronic device 100 also comprises a selection component 204, by which the user may manage the electronic device 100 in transport state. The selection component 204 may be used for managing the electronic device 100 also in principal operational state. The selection component 204 may be implemented, for instance, by a slide switch according to FIG. 2A, which can be moved in the direction of the surface of the outer cover of the electronic device 100. The selection component 204 comprises a push button 206, which the user can move in the region defined by the selection component 204. The push button 206 of FIG. 2A can be moved in two opposite directions but the selection component may be implemented in such a manner that the push button 206 can be moved in four or more directions, for instance. The selection component 204 will be described later in detail with reference to FIGS. 5A and 5B, and thus it is only mentioned in this context that the user can move a cursor 202 of the secondary display 104 by moving the push button 206 in the region defined by the selection component 204 and carry out a selection by pressing the push button 206.

The user may take the electronic device 100 into use by, for instance, by moving the push button 206 of the selection component 204 or performing some other specific function. When the electronic device 100 has received the user's action to take the electronic device 100 into use, the electronic device 100 may be configured to display a list of executable applications on the secondary display 104. The executable applications may be arranged in the list according to a certain criterion. Criteria may include the significance of the application (missed calls and messages may be more significant than game applications) or the execution history (the applications that have been executed last are displayed first). The executable applications may also be divided into categories in order to shorten the length of the list. Categories may include communication applications, game applications, media applications, etc. The list to be shown on the secondary display may only comprise some of the applications that can be performed by the electronic device 100. The secondary display 104 may also show a cursor 202, which in this example is a line underneath the application, at which the cursor 202 points. Naturally, the cursor may also be implemented visually in other ways, e.g. as a box.

The user can move the cursor 202 on the secondary display 104 by using the selection component 204. The user may move the cursor 202 to point at the application which he/she wants to execute. The user may select the desired application by pressing the push button 206 of the selection component 204, for instance. After receiving the user's selection to select a specific application, the electronic device 100 may be configured to start the selected application. After selecting the application, the user may set the electronic device mechanically from transport state to principal operational state. This procedure may be combined with the selection of an application, i.e. when the user selects an application by pressing the push button 206, the electronic device may be brought from transport state to principal operational state. With reference to FIG. 2A, the user selects in this example the application "New SMS (1)" in order to read an SMS which he/she has received. The user performs the selection by pressing the push button 206 and sets the electronic device 100 to principal operational state with this function.

Alternatively, the fact that the cursor 202 points at a specific application may be interpreted by the electronic device 100 as a selection. In this case, the user has performed a selection by moving the cursor 202 to point at this application on the secondary display 104 of the electronic device 100. In this embodiment, the electronic device 100 may be configured to start the selected application when the user sets the electronic device 100 mechanically from transport state to principal operational state by pressing the push button 206, for instance. Instead of pressing the push button 206, the electronic device 100 may be set from transport state to principal operational state, for instance, by moving the parts of a two-part electronic device 100 further away from each other by utilizing a connecting mechanism 212 between the parts so that the primary display 106 of the electronic device 100 becomes visible and usable. Still with reference to FIG. 2A, the user selects the application "New SMS (1)" by moving the cursor 202 to point at this application. After this, the user brings the electronic device 100 to principal operational state, the application is started and the user can read the SMS he/she has received.

Figure 2B:
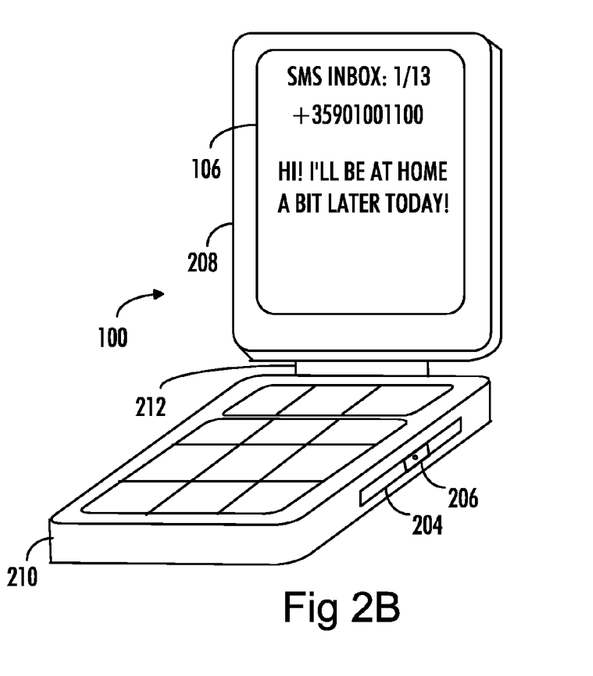
FIG. 2B shows an electronic device according to an embodiment of the invention in principal operational state, the primary display of the electronic device displaying information relating to the application the user has selected on the secondary display.

FIG. 2B illustrates the electronic device 100 according to the above embodiment in principal operational state. As FIG. 2B shows, the electronic device has two parts and comprises a connecting mechanism 212 between the parts 208, 210. The connecting mechanism 212 enables the moving of the electronic device between transport state and principal operational state. The connecting mechanism 212 may comprise a spring mechanism, which is installed in such a manner that the spring is released when the user presses the push button 206 of the selection component 204 when the electronic device 100 is in transport state, thus bringing the electronic device to principal operational state. The electronic device 100 may comprise a detection mechanism, which detects the setting of the electronic device 100 to principal operational state, and after this detection the electronic device may activate the primary display 106 of the electronic device 100.

As was mentioned above, in an embodiment the user selects an application and brings the electronic device 100 mechanically to principal operational state, and the electronic device 100 starts to perform the selected application. When the electronic device 100 is in principal operational state, it is configured to display information relating to the executable application on the primary display 106 of the electronic device 100. In this example, the user selected the function of reading of the received SMS, and thus the electronic device 100 is in this embodiment configured to display the received SMS on the primary display 106 of the electronic device 100. The user can now read the SMS, reply to it and/or perform other functions when the electronic device 100 is in principal operational state. After the user has mechanically brought the electronic device back to transport state, the electronic device 100 may be configured to display the same list of executable applications on the secondary display 104 that was displayed when the user brought the electronic device 100 from transport state to principal operational state. In this way, the user may select a new application from the list by using the selection component 204.

Alternatively, the electronic device 100 may be configured to display on the secondary display 104 of the electronic device 100 information that relates to the section at which the cursor 202 points on the primary display 106 when the electronic device 100 is brought from principal operational state to transport state. As an example, a list of executable applications is displayed on the primary display 106 of the electronic device 100 when the electronic device 100 is in principal operational state. The electronic device 100 receives a selection from the user to select a specific application, such as a media player application. The selection may be carried out, for instance, by moving the cursor 202 to point at this application or by pressing the selection button when the cursor 202 points at the application. After this, the user brings the electronic device 100 mechanically from principal operational state to transport state, in which case the electronic device 100 starts this application and displays information relating to the application on the secondary display 104 of the electronic device 100. The information to be displayed may comprise a graphical user interface of the selected application.

Figure 3A:
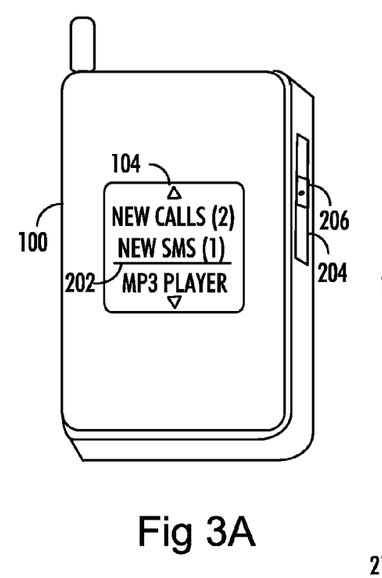
FIG. 3A shows an electronic device according to a second embodiment of the invention in transport state, the secondary display of the electronic device displaying a list of executable applications.
Figure 3B:
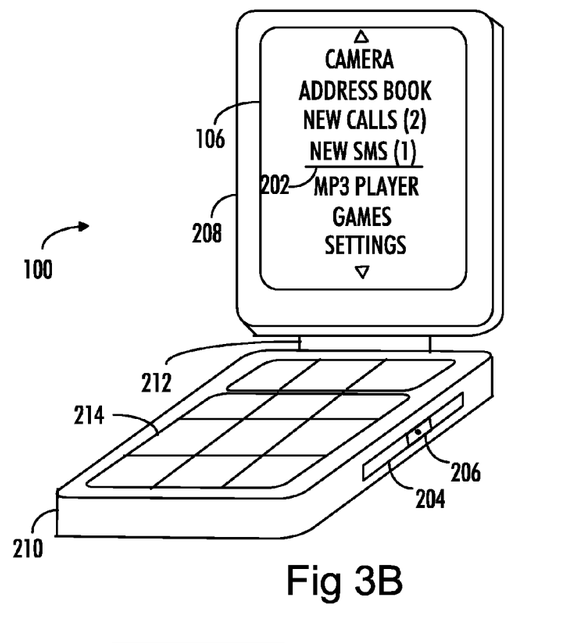
FIG. 3B shows an electronic device according to a second embodiment of the invention in principal operational state, the primary display of the electronic device displaying information relating to the application the user has selected on the secondary display.

In the following, a second embodiment of the invention is described with reference to FIGS. 3A and 3B. FIG. 3A illustrates the electronic device 100 in transport state and FIG. 3B illustrates the electronic device 100 in principal operational state. Like the above embodiment, this embodiment shows a list of executable applications on the secondary display 104 of the electronic device 100 when the electronic device 100 is in transport state. By using the selection component 204, the user may select an application from the list and bring the electronic device mechanically from transport state to principal operational state. According to this embodiment, the electronic device is configured to display the same list of executable applications on the primary display 106 in principal operational state that was displayed on the secondary display 104 just before the electronic device 100 was brought to principal operational state. The user may now use the larger, primary display 106, on which it is easier to find the application the user wants to start. The user may also select the application from the list shown on the primary display by using the selection component 204 and start the application by pressing the push button 206. Alternatively, the user may select an application by employing other input means, such as a keyboard 214. After the user has brought the electronic device 100 back to transport state, the electronic device 100 may be configured to display the same list of executable applications on the secondary display 104 that was displayed on the secondary display 104 just before the electronic device 100 was brought to principal operational state.

In the embodiment described above, the same information is displayed on the secondary display 104 as on the primary display 106 but the larger size of the primary display is utilized in principal operational state. According to this embodiment, the electronic device may be configured such that the user may start to execute the application by using the secondary display when the electronic device is in transport state and bring the electronic device to principal operational state when he/she wants to finish the execution of the application by using the primary display. For example, the user may start writing an SMS or an e-mail by using the secondary display but may like to finish writing the message by using the larger, primary display and possibly better input means, which may be used only in principal operational state (cf. Nokia Communicator®). In this case, the user can set the electronic device to principal operational state at any stage and carry on writing the message. Thus, the user does not need to start writing the message again after he/she has set the electronic device to principal operational state.

Figure 4:
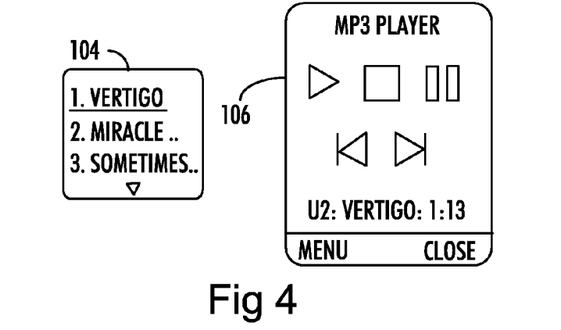
FIG. 4 shows an electronic device according to an embodiment of the invention, in which both the primary and the secondary display of the electronic device display information relating to the application the user has selected.

With reference to FIG. 4, the electronic device 100 may be configured according to an embodiment of the invention so that the user may start to execute an application by using the secondary display 104 when the electronic device 100 is in transport state. For example, the user may start a media player of the electronic device 100 by selecting the application on the secondary display 104. The electronic device may be configured to start the media player and display information relating to the media player on the secondary display 104. The information may be, for instance, a part of the user interface of the media player, such as a list of reproducible songs. The user may start playing the desired song by selecting this song with the selection component 204. If the user likes to perform other media player functions, he/she can bring the electronic device 100 to principal operational state, in which the electronic device 100 may be configured to display an extended user interface of the media player on the primary display 106.

The electronic device may be configured to display information on both the primary 106 and the secondary display 104 when the electronic device 100 is in principal operational state. As FIG. 4 shows, the user interface of the media player of the electronic device may be implemented, for instance, in such a manner that the user interface is divided onto two displays. Thus, a larger display area can be provided for the user. In FIG. 4, the user interface of the media player is divided between two displays so that the secondary display 104 shows a list of reproducible songs. The user can select a song he/she wants to play from this list. The selection can be performed by the selection component 204, for instance. The primary display 106, for its part, shows the user interface, by which the user may perform other functions, such as select the preceding/next song, stop playing the song, etc. Although the above example illustrates the division of the user interface of a media player onto two displays 104, 106, the division of a user interface onto two displays may also be implemented in other applications.

Figure 5A:
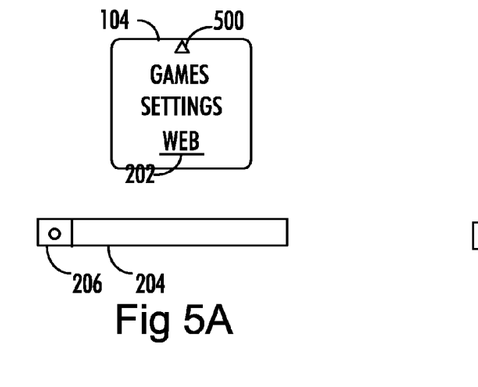
FIG. 5A shows the operation of a selection component according to an embodiment of the invention.
Figure 5B:
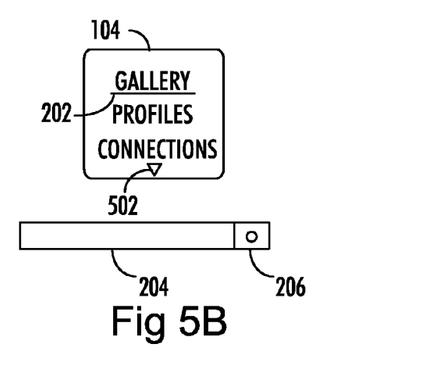
FIG. 5B shows the operation of a selection component according to an embodiment of the invention.

In the following, the operation of the selection component 204 of the electronic device 100 according to an embodiment of the invention is described with reference to FIGS. 5A and 5B. The display 104 shown in the figures may be a primary or a secondary display of an electronic device. As was mentioned before, the electronic device 100 is configured to move the cursor 202 on the display 104 according to the movement of the push button of the selection component 204. In the example of FIGS. 5A and 5B, the push button 206 can be moved along an axis in two opposite directions in the region defined by the selection component 204. Such a selection component 204 is advantageous when the list shown on the display 104 is browsed. The electronic device 100 may be configured to combine the cursor 202 with the last component ("WEB" in FIG. 5A) of the list when the push button 206 is at the first extreme end of the region defined by the selection component 204 and to combine the cursor 202 with the first component ("GALLERY" in FIG. 5B) of the list when the push button 206 is at the second extreme end of the region defined by the selection component 204. The display 104 may show components 500, 502 to indicate the directions in which the list continues. Between the extreme ends, the region defined by the selection component 204 may be divided into as many segments as there are components in the list to be displayed. At the boundary between two segments there may be a threshold, and after the push button 206 has passed this threshold, the cursor will point at the component which is combined with the segment to which the push button 206 has been moved. Let us assume, for instance, that the list to be shown on the display comprises three components which the user can select by the selection button 204. Consequently, the region defined by the selection component 204 is also divided into three segments so that the middle component of the list is combined with the middle segment and the components of the extreme ends of the list are combined with the extreme segments correspondingly. When the push button 206 is moved from an extreme segment over the threshold at the boundary between two segments to the side of the middle segment, the cursor will point at the middle component on the display. Correspondingly, when the push button 206 is moved from the middle segment to either of the extreme segments, the cursor starts to point at the component which is combined with the segment to which the push button 206 was moved.

Figure 6:
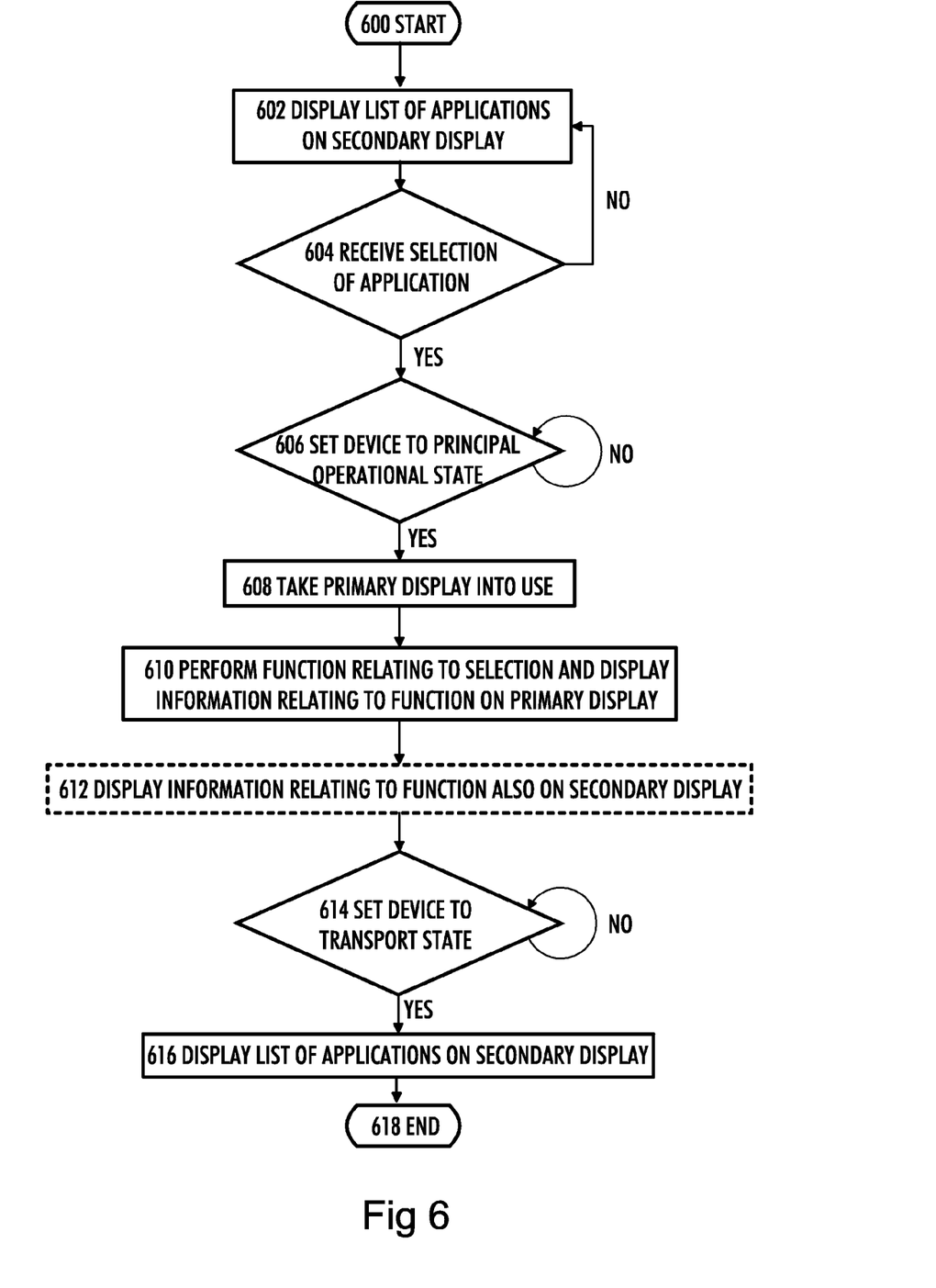
FIG. 6 is a flow chart of a method according to an embodiment of the invention for controlling a user interface of an electronic device.

In the following, a method according to an embodiment of the invention for controlling an user interface of an electronic device is described with reference to the flow chart of FIG. 6. The method starts in block 600, and the electronic device is in transport state. In block 602, a list of executable applications is displayed on the secondary display of the electronic device.

In block 604 it is checked whether a selection has been received from the user for selecting a specific application from a list of executable applications shown on the secondary display of the electronic device. If no selection has been received from the user, the process returns to block 602. If a selection has been received from the user for selecting an application, the process advances to block 606, where it is checked whether the user has set the electronic device mechanically from transport state to principal operational state. If the user has set the electronic device mechanically from transport state to principal operational state, the process advances to block 608 and takes the primary display of the electronic device into use.

After this, the process advances to block 610 and performs a function relating to the user's selection and displays information relating to the function on the primary display of the electronic device. The function may comprise, for instance, starting the application the user has selected or displaying the same list of executable applications on the primary display that was displayed in block 602 before advancing to block 604. From block 610 the process advances to block 612, where information relating to the function is also displayed on the secondary display of the electronic device. It is also possible not to advance to block 612, in which case the process advances to block 614 after block 610. It is checked in block 614 whether the user has mechanically brought the electronic device from principal operational state to transport state. If the user has set the electronic device to transport state, the process advances to block 616, where a list of executable applications are shown on the secondary display of the electronic device. The list may be the same as was displayed in block 604 when the user's selection was received for selecting a specific application. The method ends in block 618.

The embodiments of the invention may be implemented in an electronic device comprising a primary and a secondary display, input means and a controller. The controller may be configured to perform at least some of the functions described in connection with the flow chart of FIG. 6 and in FIGS. 2A, 2B, 3A, 3B, 4, 5A and 5B. The embodiments may be implemented as computer software comprising instructions to carry out a computer process to control the user interface of the electronic device.

Computer software may be stored on a storage means readable with a computer or a processor. The storage means may be, for instance, an electric, magnetic, optical, infrared or semiconductor system, device or a transportable storage means. The storage means may be, for instance, a memory unit, storage medium, such as CD-ROM or DVD-ROM, or data transmission signal.

Although the invention is described above with reference to the example according to the attached drawings, it is obvious that the invention is not restricted thereto but may be modified in various ways within the scope of the attached claims.

The invention claimed is:

1. A method comprising:
receiving a selection from a user of an application from a list of executable applications on a secondary display of an electronic device;
in response to recognition of physical movement of at least a portion of the electronic device, wherein recognition of the physical movement sets the device to a principal operational state, displaying on a primary display of the electronic device information relating to the selected application, where the displayed information on the primary display differs from the list of executable applications on the secondary display and comprises an interface for the selected application; and
performing in the electronic device a predetermined function relating to the user's selection, whereby information relating to the predetermined function is displayed on the primary display of the electronic device.

2. The method as claimed in claim 1, further comprising displaying on the primary display of the electronic device same information that was displayed on the secondary display before setting the electronic device from the transport state to the principal operational state.

3. The method as claimed in claim 1, further comprising arranging the list of executable applications displayed on the secondary display of the electronic device according to a criterion including one of the following criteria: significance of applications, application execution history.

4. The method as claimed in claim 1, further comprising dividing the executable applications into categories to shorten the length of the list displayed on the secondary display.

5. The method as claimed in claim 1, wherein the predetermined function comprises: displaying a list of executable applications to the user on the primary display of the electronic device.

6. The method as claimed in claim 1, wherein the predetermined function comprises: starting the application the user has selected in the electronic device and displaying information relating to the application at least on the primary display of the electronic device.

7. The method as claimed in claim 6, further comprising:
starting the application the user has selected in the electronic device when a selection has been received from the user for selecting an application, before taking the primary display of the electronic device into use.

8. The method as claimed in claim 1, further comprising:
displaying information relating to the predetermined function on the secondary display of the electronic device when the predetermined function relating to the user's selection is performed in the electronic device.

9. The method as claimed in claim 1, further comprising:
displaying on the secondary display of the electronic device the same list of executable applications that was displayed when a selection was received from the user for selecting an application, when the user mechanically sets the electronic device from principal operational state to transport state.

10. The method as claimed in claim 1, further comprising:
taking the primary display of the electronic device into use when the user opens a cover of the primary display of the electronic device.

11. The method as claimed in claim 1, wherein in the transport state less than all functions of the electronic device are available and in the principal operational state all functions of the electronic device are available to the user.

12. The method as claimed in claim 1, wherein the selection triggers the electronic device to be mechanically set from transport state to principal operational state comprising exposing a primary display to the user.

13. An apparatus comprising:
at least one processor;
memory storing a program of instructions;
wherein the memory storing the program of instructions is configured to, with the at least one processor, cause the apparatus to at least:
configure a principal operational state for an electronic device, wherein a primary display is operational when the electronic device is in the principal operational state;
configure a transport state for the electronic device, wherein a secondary display is operational at least when the electronic device is in transport state; recognize inputs of the user entered at an input unit; and display information relating to the selected application on the primary display of the electronic device in response to mechanical setting of the electronic device from transport state to principal operational state, where the displayed information on the primary display differs from the list of executable applications on the secondary display and comprises and interface for the selected application, and to perform a predetermined function relating to the user's selection from the list of executable applications on the secondary display in the electronic device, whereby, controlled by the processing unit, information relating to the predetermined function is displayed on the primary display of the electronic device.

14. The apparatus as claimed in claim 13, wherein the processing unit is configured to display on the primary display of the electronic device same information displayed on the secondary display before setting the electronic device from the transport state to the principal operational state.

15. The apparatus as claimed in claim 13, wherein the processing unit is configured to arrange the list of executable applications displayed on the secondary display of the electronic device according to a criterion including one of the following criteria: significance of applications, application execution history.

16. The apparatus as claimed in claim 13, wherein the processing unit is configured to divide the executable applications into categories to shorten the length of the list displayed on the secondary display.

17. The apparatus as claimed in claim 13, wherein the processing unit is configured to display the list of executable applications to the user on the primary display of the electronic device as a predetermined function.

18. The apparatus as claimed in claim 13, wherein the processing unit is configured to start the application the user has selected in the electronic device as a predetermined function and to display information relating to the application at least on the primary display of the electronic device.

19. The apparatus as claimed in claim 18, wherein the processing unit is configured to start the application the user has selected in the electronic device when the selection is received from the user for selecting an application, before the primary display of the electronic device is taken into use.

20. The apparatus as claimed in claim 13, wherein the processing unit is configured to display information relating to the predetermined function also on the secondary display when it performs the predetermined function relating to the user's selection in the electronic device.

21. The apparatus as claimed in claim 13, wherein the processing unit is configured to display on the secondary display the same list of executable applications that was displayed when a selection was received from the user for selecting an application, when the user mechanically sets the electronic device from principal operational state to transport state.

22. The apparatus as claimed in claim 13, wherein the electronic device also comprises a selection component, which is applicable at least when the electronic device is in transport state and by which the user can move a cursor on the secondary display of the electronic device and select an application.

23. The apparatus as claimed in claim 22, wherein the selection component comprises a push button movable in the direction of the surface of an outer cover of the electronic device.

24. The apparatus as claimed in claim 23, wherein the push button is movable in order to move the cursor on the secondary display of the electronic device and that by pressing the push button an application displayed on the secondary display may be selected and the setting of the electronic device from transport state to principal operational state is triggered.

25. The apparatus as claimed in claim 13, wherein the electronic device has two parts and comprises a connecting mechanism between parts, allowing the electronic device to be set mechanically from transport state to principal operational state and from principal operational state to transport state.

26. The apparatus as claimed in claim 25, wherein, when the electronic device is set from principal operational state to transport state, the first part of the device serves as a cover for the primary display in the second part of the device.

27. The apparatus as claimed in claim 26, wherein the processing unit is configured to take the primary display of the electronic device into use when the user opens the cover of the primary display of the electronic device.

28. The electronic device as claimed in claim 13, wherein in the transport state less than all functions of the electronic device are available and in the principal operational state all functions of the electronic device are available to the user.

29. The apparatus as claimed in claim 13, wherein the selection from the user triggers the electronic device to be mechanically set from transport state to principal operational state exposing the primary display to the user.

30. An apparatus comprising:
at least one memory including computer program code; and
at least one processor configured to, with the at least one memory and the computer program code, cause the apparatus at least to
configure a principal operational state for an electronic device, wherein a primary display is operational when the electronic device is in the principal operational state;
configure a transport state for the electronic device, wherein a secondary display is operational at least when the electronic device is in transport state;
recognize inputs of the user entered at an input unit;
receive via the user input unit a selection from a user for selecting at least one application from a list of executable applications on the secondary display;
display information relating to the selected application on the primary display in response to recognition of physical movement of at least a portion of the electronic device, wherein recognition of the physical movement sets the device to a principal operational state, where the displayed information on the primary display differs from the list of executable applications on the secondary display and comprises an interface for the selected application; and
perform a predetermined function relating to the user's selection from the list of executable applications on the secondary display, whereby information relating to the predetermined function is displayed on the primary display.

31. The apparatus as claimed in claim 30, wherein the processor and memory are further configured to cause the apparatus to display information relating to the predetermined function on the secondary display when the predetermined function relating to the user's selection is performed in the apparatus.

32. A non-transitory computer-readable storage storing a program of instructions, execution of which by a processor configures an apparatus to at least:
receive a selection from a user for selecting an application from a list of executable applications on a secondary display of an electronic device;
in response to recognition of physical movement of at least a portion of the electronic device, wherein the physical movement sets the device to a principal operational state, display information relating to the selected application on a primary display of the electronic device where the displayed information on the primary display differs from the list of executable applications on the secondary display and comprises an interface for the selected application; and
perform in the electronic device a predetermined function relating to the user's selection, whereby information relating to the predetermined function is displayed on the primary display of the electronic device.

33. The non-transitory computer-readable medium as claimed in claim 32, execution of the program of instructions by the processor further configures the apparatus to:
    display information relating to the predetermined function on the secondary display when the predetermined function relating to the user's selection is performed in the electronic device.

\* \* \* \* \*